(12) United States Patent
Kayama

(10) Patent No.: US 6,250,784 B1
(45) Date of Patent: Jun. 26, 2001

(54) VEHICULAR WING MIRROR HAVING A LIGHT-TRANSMITTING HOUSING

(75) Inventor: Takanari Kayama, Higashiosaka (JP)

(73) Assignee: Yasuhiro Kawasaki, Tokyo (JP)

( * ) Notice: Subject to any disclaimer, the term of this patent is extended or adjusted under 35 U.S.C. 154(b) by 0 days.

(21) Appl. No.: 09/352,786

(22) Filed: Jul. 14, 1999

(30) Foreign Application Priority Data

Jul. 14, 1998 (JP) .................................................. 10-197903

(51) Int. Cl.[7] ...................................................... B60Q 1/26
(52) U.S. Cl. .......................... 362/494; 362/135; 362/355; 362/311
(58) Field of Search ..................................... 362/494, 545, 362/311, 140, 135, 355, 246; 340/468

(56) References Cited

U.S. PATENT DOCUMENTS 1,563,258 * 11/1925 Cunningham ......................... 362/494

* cited by examiner

*Primary Examiner*—Alan Cariaso
*Assistant Examiner*—Ronald E. DelGizzi
(74) *Attorney, Agent, or Firm*—Wenderoth, Lind & Ponack, L.L.P.

(57) ABSTRACT

A wing mirror for use in a vehicle in which a mirror is housed includes a body case in which at least a front structural wall is formed of a light-transmitting material. A light emitting element is housed in the body case at a portion thereof opposing said light-transmitting material, so that radiation of the light emitting element can be visible from at least the front of the vehicle through the light-transmitting material.

27 Claims, 5 Drawing Sheets

VEHICULAR WING MIRROR HAVING A LIGHT-TRANSMITTING HOUSING

BACKGROUND OF THE INVENTION

1. Field of the Invention

The present invention relates to a wing mirror for use in a vehicle, and particularly, to wing mirrors mounted on a car door or a car body to project laterally from both sides thereof.

2. Description of the Related Art

A vehicle such as an automobile or a motorcycle mounts two wing mirrors on the vehicle body to project laterally from both sides thereof, and the interval between the two wing mirrors is measured as the maximum width of the vehicle body. At night, in particular, the width of the vehicle body can just be seen with the aid of headlights and taillights, but it is hard to visually confirm the positions of the wing mirrors, thus causing a possible minor collision because pedestrians, bicycles, motorcycles and cars on the opposite lane may collide with the wing mirror.

For avoidance of this kind of collision, there have been proposed wing mirrors which are designed to include light-emitting elements, so as to allow the wing mirrors to radiate at night. For example, Japanese Laid-open Utility Model Publications No. Sho 62(1987)-121141, No. Hei 2(1990)-117936 and No. Hei 6(1994)-81836 propose several types of wing mirrors.

Those examples are designed so that the wing mirror is provided, in an interior or exterior thereof, with a light-emitting element using a light-emitting diode, an electric lamp, an electroluminescense and the like, so that the wing mirror can be lit up to ensure that the position of the projected wing mirror can be visible to pedestrians, bikes and cars on the opposite lane to prevent the minor collision with the wing mirror.

These proposed wing mirrors, which are provided with various kinds of light-emitting elements in the interior of the body case or in the exterior thereof, are all designed such that part of a body case of the wing mirror is made of transparent or translucent material or such that a gap is formed between the mirror and the body case. The wing mirrors thus designed disadvantageously cause some sense of incompatibility due to their appearance, as compared with the existing wing mirrors.

Thus, these conventional type of wing mirrors have the disadvantage of spoiling the total vehicle design or coloring or, in some instances, presenting a poor appearance.

SUMMARY OF THE INVENTION

It is the object of the present invention to provide an improved wing mirror mounted on a vehicle to project laterally from both sides of the vehicle body, and which have therein a light-emitting element, the improved wing mirror being structured to present excellent design with little sense of incompatibility with the vehicle body.

To accomplish the above said object, the present invention provides a wing mirror for use in a vehicle, projecting laterally from a body of the vehicle and which has a traffic indicator and a hazard flasher. At least a front structural wall of a body case in which a mirror is housed is formed of a light-transmitting material and also a light emitting element is housed in the body case at a portion thereof opposing the light-transmitting material. Therefore, radiation of the light emitting element can be visible from at least the front of the vehicle through the light-transmitting material.

The wing mirror thus constructed operates as follows.

At least the front structural wall of the body case is formed of a light-transmitting material, the light emitting element is housed in the body case at a portion thereof at which the light emitting element is arranged opposite to the light-transmitting material. Therefore, when the light emitting element emits light, the light emitted therefrom can be allowed to pass through the body case, so that at least the front structural wall looks like it is radiating. Thus, even at night, the positions of the wing mirrors are plainly visible at least from the front of the vehicle.

It is noted that any light emitting element may be used, as long as it functions as a source of light having the capability of emitting light whose intensity is strong enough to pass through the body case. To be more specific, the light emitting elements which may be used include an electric lamp and a light-emitting diode.

An outer surface of the body case may be colored the same color as that of the body of the vehicle. With this construction, unless the light emitting element is allowed to radiate, no change is visually given to a common wing mirror mounted on an existing vehicle body and no internal structure in which the light emitting element is housed in the body case is visible from outside.

Further, a light-diffusing portion may be arranged on an inner surface of the light-transmitting material of the body case. With this construction, the light emitted from the light emitting element is diffused by the lightdiffusing portion.

Further, a part of the light emitting element may be so set in the case body as to emit light toward a rear portion of the vehicle. In addition, a rear structural wall of the body case may be formed of a light-transmitting material.

The light emitting element may be structured to emit light in association with the traffic indicator.

Also, the light emitting element may be structured to emit light in association with the hazard flasher.

Further, the body case may be formed of transparent resin, on an outer surface of which a light-transmitting coating is formed, and the lighttransmitting coating may be formed by a light-transmitting paint film or light-transmitting deposition film.

The light-transmitting coating may be colored the same color as that of the body of the vehicle.

The light-transmitting coating is applied to the whole outer surface of the body case, and a non-light-transmitting coating is applied to a part of an inner surface of the body case. The light emitting element is then provided in an area opposing an area in which the non-light-transmitting coating is formed.

The light-transmitting coating on the outer surface of the body case may be formed by metallizing.

BRIEF DESCRIPTION OF THE DRAWINGS

These and other objects and advantages of the invention will become more apparent upon a reading of the following detailed description and drawings, in which.

It is noted that the same numerals appearing in illustration denote the same elements or equivalent.

DETAILED DESCRIPTION OF THE PREFERRED EMBODIMENT

With reference to the accompanying drawings, examples of the preferred embodiments of the present invention will be described below.

Figure 1:
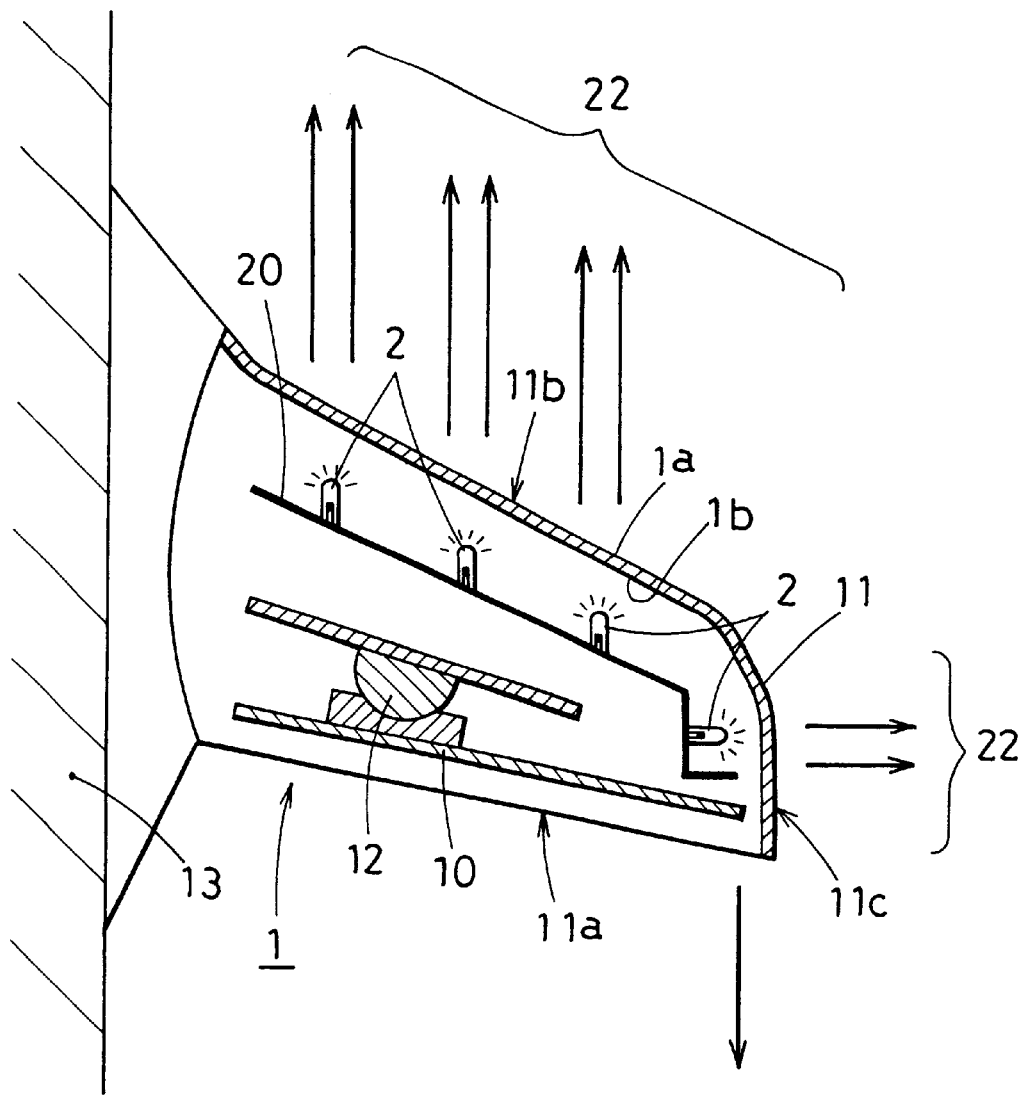
FIG. 1 is a cross-sectional view of a wing mirror of the first embodiment of the present invention.

Illustrated as embodied forms of the present invention are wing mirrors mounted on front ends of car doors. FIG. 1, which is a crosssectional view of a wing mirror 1 of the first embodiment of the present invention, illustrates the wing mirror 1 mounted on a car door 13 at the right-hand side of a car body. The upper side, lower side and right-hand side of the diagram show a front side, a rear side and a lateral side of an automobile, respectively.

The wing mirror 1 comprises a body case 11 mounted on the car door 13 and having an opening at a rear end thereof and a mirror 10 received in the body case 11 in such a manner as to close the opening at the rear end of the body case 11. The mirror 10 is set to cover almost all areas of a rear part 11a of the body case 11, and is supported by a support 12 having a spherical surface and provided in the interior of the body case 11 so that the set angle of the mirror 10 with respect to the car body can be adjusted along the spherical surface of the support 12 in the interior of the body case 11.

Figure 2:
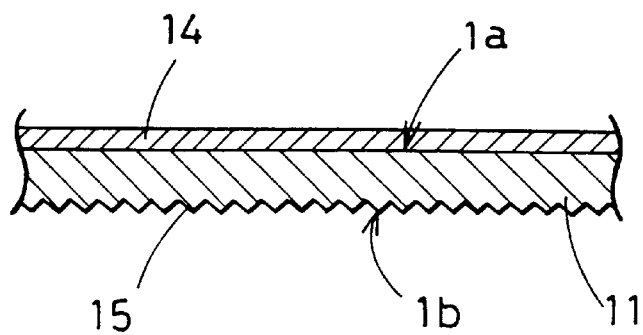
FIG. 2 is an enlarged sectional view of a principal part of a structural wall of a body case forming the wing mirror of the embodiment of the present invention.

The body case 11 is formed in entirety of a transparent resin and its whole outer surface 1a is coated with a light-transmitting paint 14 which is the same color as the car body when no light passes through the light-transmitting paint, as shown in FIG. 2. An inner surface 1b of the body case 11 is of diamond-cut to form a lighttransmitting cut surface 15 thereon.

In the body case 11, a plurality of electric lamps 2 of light-emitting elements are arranged opposite to the front part 11b and the side part 11c of the body case 11. The electric lamps 2 are disposed on a supporting base 20 and are so designed as to light in association with the lighting of small lights of the automobile.

When the electric lamps 2 are lit, the light emitted from the lamps 2 is diffused by a light-diffusing cut surface 15 formed on the inner surface 1b of the body case 11, and is allowed to pass through the body case 11 to the outside by means of the light-transmitting paint 14 coated over the whole area of the outer surface 1a of the body case 11, as indicated by arrows of FIG. 1. In this embodiment, in particular, since the electric lamps 2 are arranged opposite to the front part 11b and the side part 11c of the body case 11, the front part 11b and the side part 11c of the body case 11 comprise a light emitting part 22. Thus, the position of the wing mirror 1 can be visually confirmed at night from the front and lateral sides of the car.

Though the embodiment of FIG. 1 has no electric lamps 2 arranged opposite to the rear part 11a of the body case 11, the light emitted from the electric lamps 2 arranged opposite to the side part 11c is diffused by the action of the light-diffusing cut surface portion 15, and a part thereof is emitted toward the rear part 11a of the body case 11 as well. As a result of this, the body case 11 radiates as a whole.

Thus, the emission of the electric lamps 2 housed in the body case 11 can ensure that the positions of the projected wing mirrors 1 can be visible to pedestrians, bicycles, motorcycles and cars not only from the front and lateral sides of the car, but also from the rear of the car. Therefore, a minor collision with the wing mirrors 1 can be prevented in the dark such as at night.

In the wing mirror 1 of this embodiment, since the outer surface of the body case 11 is coated with the paint of the same color as that of the car body, the existence of the electric lamps 2 is not visible from outside in the light such as in daytime in which no emission from the electric lamps is required. This can prevent the wing mirror 1 having the light-emission function from spoiling the original car value in design and coloring.

When a light-transmitting coating formed by the light-transmitting paint 14 is increased in thickness by providing multiple coats of the paint one over another, then the coating makes it difficult to transmit light, so luminous intensity of the wing mirror 1 is reduced. Thus, the thickness of the light-transmitting coating may be varied in order to adjust the luminous intensity of the wing mirror 1 to such an adequate quantity of light so that one does not dazzle. Also, the color can be adjusted by a mixture of two or more paints 14, to provide a wing mirror having the light-emission function and substantially the same color as the car body.

Figure 3:
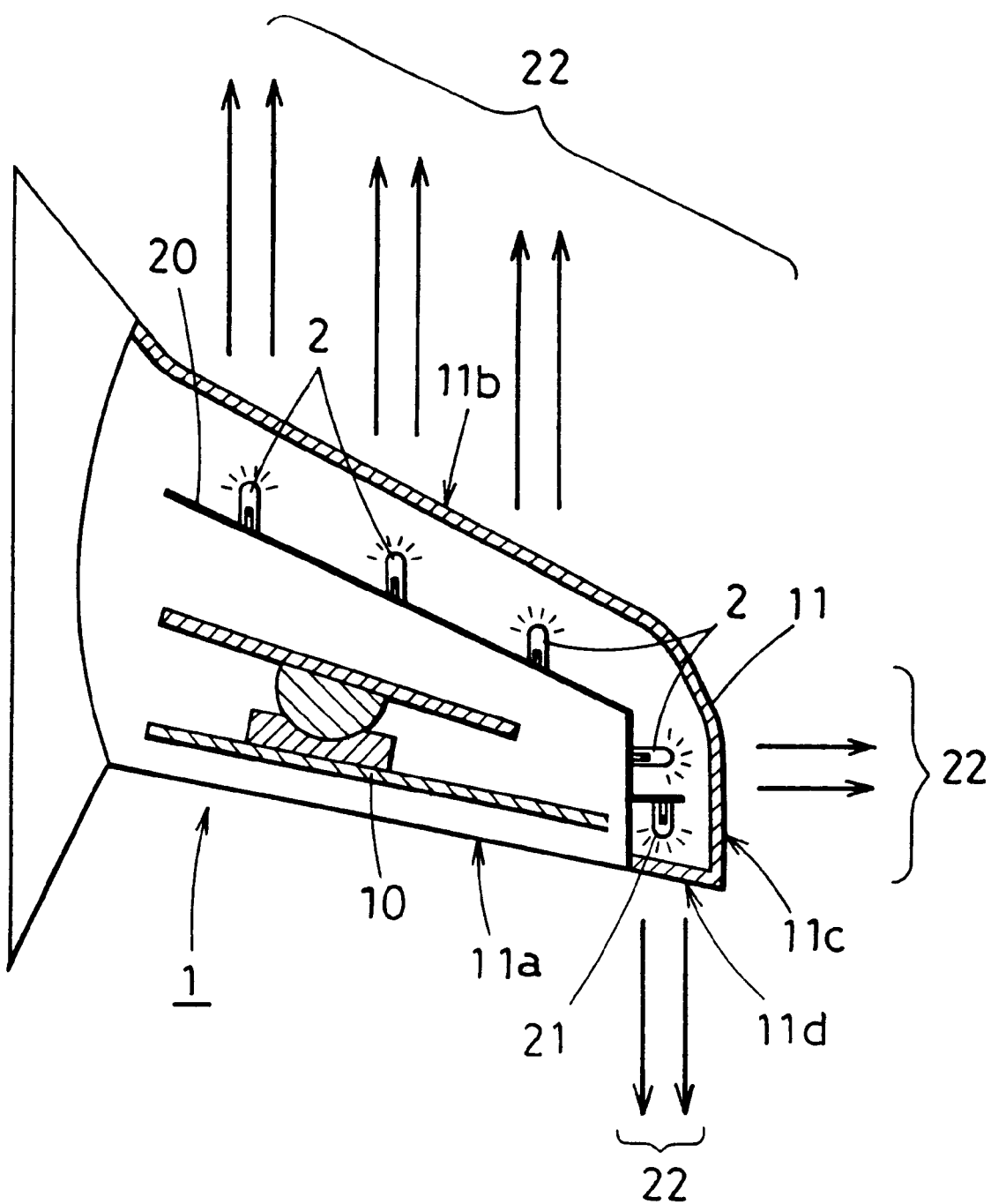
FIG. 3 is a cross-sectional view of the wing mirror of the second embodiment of the present invention.
Figure 4:
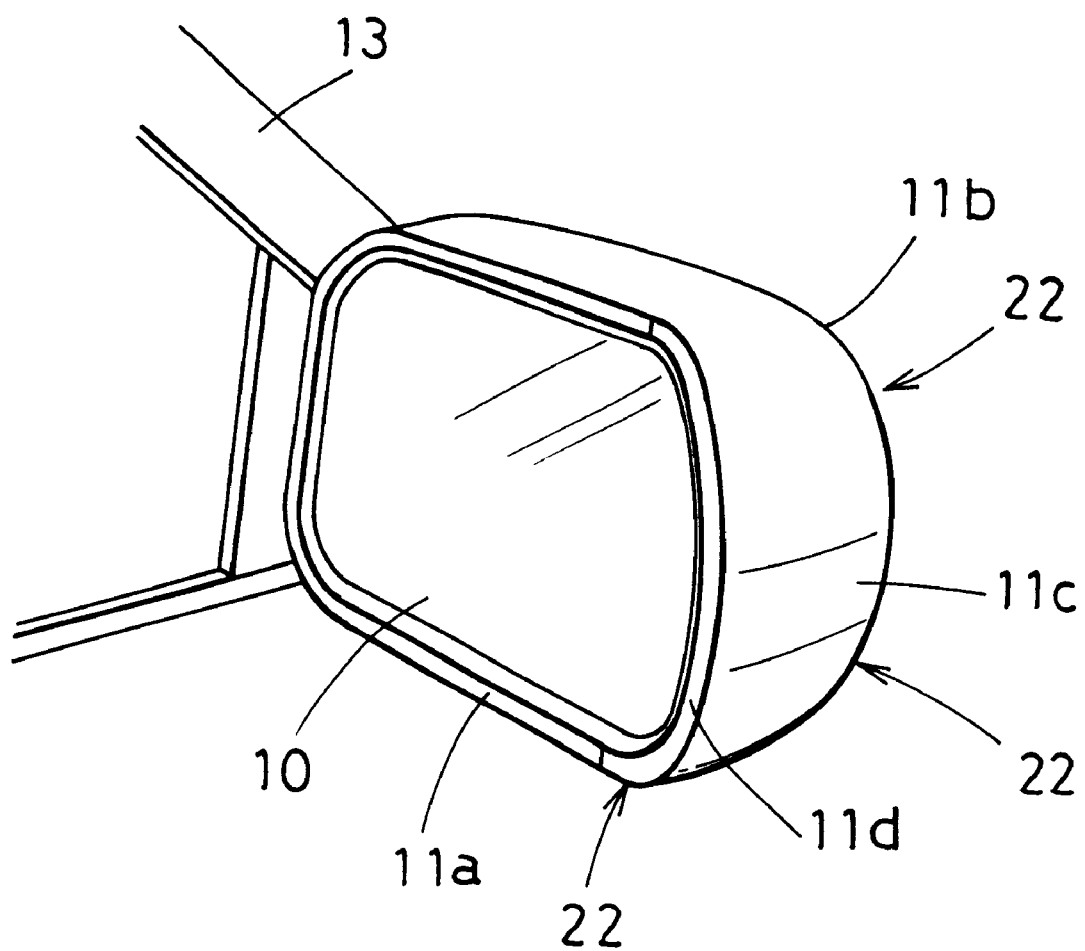
FIG. 4 is a perspective view of the wing mirror of the second embodiment.

FIG. 3 is a cross-sectional view of the wing mirror 1 of the second embodiment of the present invention and FIG. 4 is a perspective view thereof.

The body case 11 forming the wing mirror 1 of the second embodiment is also formed of a transparent resin, as is the case of the first embodiment, and is provided with a side piece 11d at an outside of the mirror 10 on the side of the rear part 11a of the body case 11. An outer surface of the side piece 11d is also coated with the light-transmitting paint 14, as is the case with the front part 11b and the side part 11c, and an additional electric lamp 21 is arranged opposite to the side piece 11d.

In the second embodiment, since the light emitting part 22 is positively arranged on the side of the rear part 11a of the body case 11 as well, the positions of the projected wing mirrors 1 of the stopped car can be visible to pedestrians, bicycles, motorcycles and cars passing the stopped car from behind. This can provide improved safety from behind as well as from the front and lateral side of the car.

Figure 5:
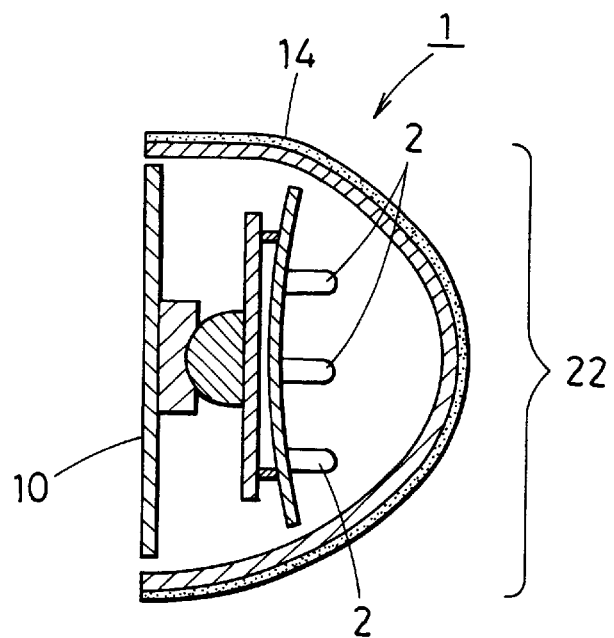
FIG. 5 is a sectional view taken along line X—X of FIG. 6 from which the internal structure is omitted.
Figure 6:
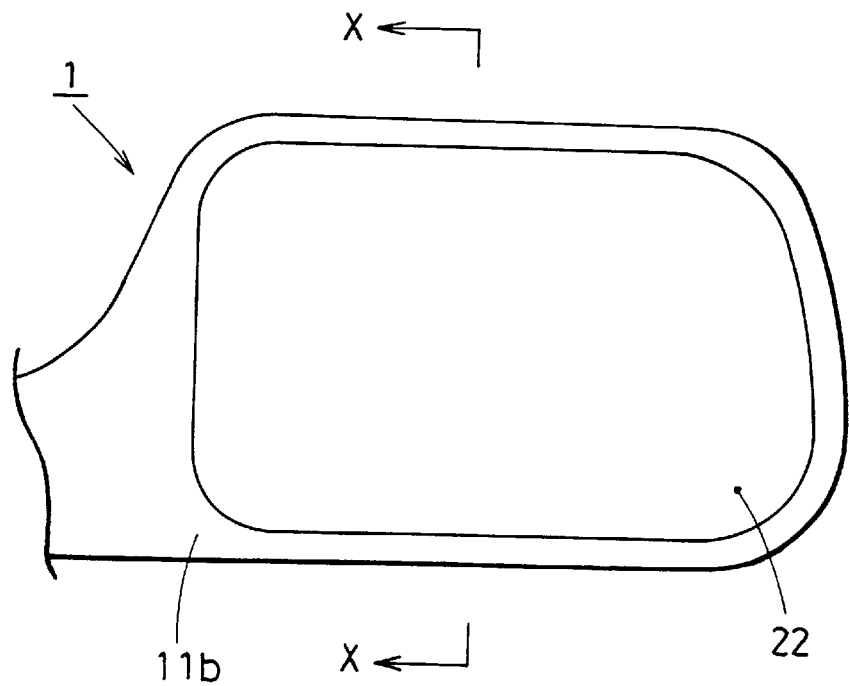
FIG. 6 is an illustration of the wing mirror, showing an example of an arrangement of a light-emitting part being arranged over almost all areas of the front of the body case.

Modification may be made, as shown in FIG. 5, such that the whole area of the front part 11b of the wing mirror 1 is coated with the lighttransmitting paint 14, and the electric lamps 2 oriented toward the front part 11b can be spaced vertically in two or more rows. With this modified arrangement, almost the whole area of the front part 11b of the wing mirror 1 results in the light emitting part 22, as shown in FIG. 6.

Figure 7:
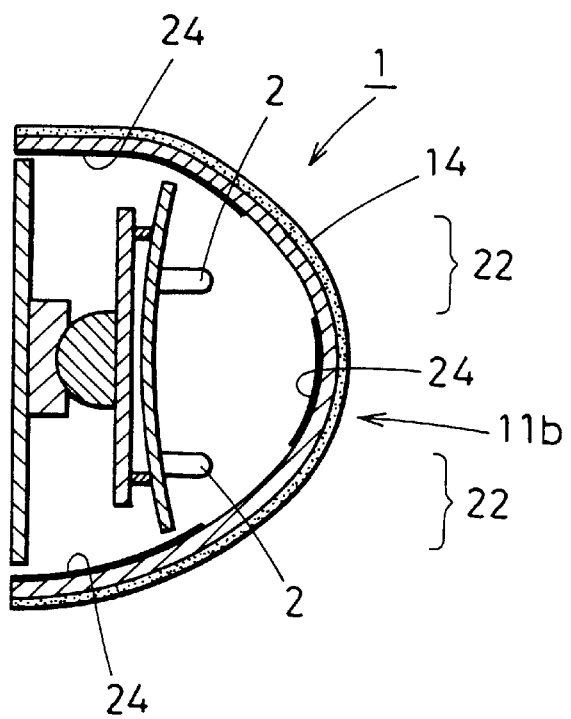
FIG. 7 is a sectional view taken along line Y—Y of FIG. 8 from which the internal structure is omitted.
Figure 8:
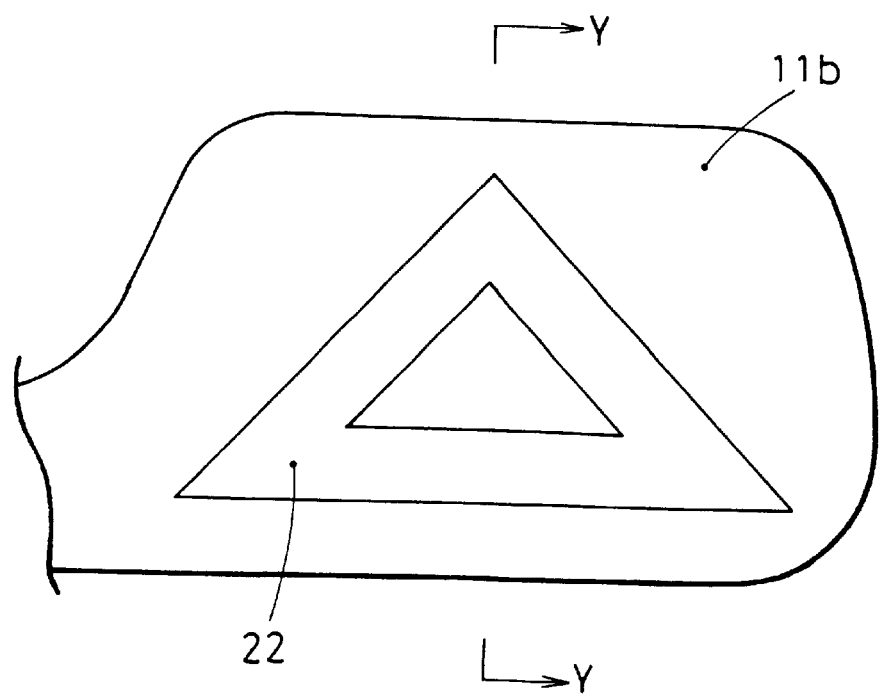
FIG. 8 is an illustration of the wing mirror, showing an example of an arrangement in which the light-emitting part is arranged only in a lower area of the front of the body case.

Shown in FIGS. 7 and 8 is a further modified arrangement in which the electric lamps 2 are designed to emit light in association with a hazard flasher. In this arrangement, the whole outer surface of the front part 11b of the body case 11 is coated with the light-transmitting paint 14, while the whole inner surface of the body case 11, except a triangle-like part having a given width, is coated with a non-light-transmitting paint 24. As a result of this, a triangular light-transmitting part is formed on the front part 11b of the body case 11. The electric lamps 2 are preferably arranged at locations corresponding to the apex and the base of the triangle, so that at the same time as the flashing of the existing hazard flashers arranged at a lower part of the vehicle, the triangle-like light emitting part 22 can flash so as to give a further explicit notice on the state of emergency of the car to surroundings.

The triangle-like light transmitting part can be easily formed in such a manner that after the triangle-like masking is given to the inner surface of the body case 11, the coating of the non-light-transmitting paint 24 is applied to the whole area thereof except the masked part and, thereafter, the masking is removed.

Modification may be made in a like manner such that masking corresponding to specific letters or figures is provided on the inner surface of the front part 11b of the body case 11 and then the coating of the non-lighttransmitting paint 24 is applied to the whole area thereof except the masked parts. This enables the specific letters or figures to be exposed in the form of the light emitting part 22 in response to the radiation of the electric lamps 2, thus providing improved ornamental effects of the wing mirror 1 at the time of radiation.

Further modification may be made such that the electric lamps 2, 21 can be arranged so as to light up with traffic indicators. This can provide the advantage of ensuring the confirmation of the direction of travel of the vehicle as well as the positions of the projecting wing mirrors 1. Particularly, even when the existing blinkers or traffic indicator lights located in a lower part of the vehicle are out of sight due to an obstacle such as another vehicle or something, the direction of travel of the vehicle can be confirmed by seeing the flashing of the wing mirrors 1, thus producing improved safety.

In the embodied forms of the present invention as described above, the electric lamps used as the light emitting elements may preferably be of a cassette type. This can facilitate the replacement of a burnt-out electric lamp. The light-emitting diode may be used as a substitute for the electric lamp. In this case, undesirableness such as the burnt-out of the electric lamp can be avoided to thereby produce a longer life of the light emitting element.

The light-transmitting coating may be formed by vacuum deposition to match with the appearance of a plated one, rather than by painting. In this case, the wing mirror may be colored silver which is a harmonious color with any color of the vehicle body, without being limited to the same color as that of the vehicle body.

While in the illustrated embodiments the wing mirrors mounted on the car door are structured to radiate, the wing mirrors of the present invention may also be used for those mounted to front wings or front fenders of automobiles or rear-view mirrors of motorcycles.

While the preferred embodiments of the invention have been described, it is to be understood that various changes and modifications may be made in the invention without departing from the sprit of the present invention. The scope of the invention, therefore, is to be determined solely by the following claims.

What is claimed is:

1. A wing mirror projecting from a vehicle, said wing mirror comprising:
   a body case formed of one of a transparent resin and a translucent resin, said body case having an outer surface and a front wall, said outer surface of said body case having a light-transmitting coating formed thereon, said light-transmitting coating comprising one of a light-transmitting paint film and a light-transmitting deposition film;
   a mirror housed in said body case;
   a light emitting element arranged in said body case so as to oppose at least said front wall such that light is radiated from said light emitting element through at least said front wall of said body case.

2. The wing mirror of claim 1, wherein at least said outer surface of said body case has the same color as a body of the vehicle.

3. The wing mirror of claim 1, wherein said body case has an inner surface including a light-diffusing surface on at least a portion of said inner surface.

4. The wing mirror of claim 3, wherein an entirety of said inner surface includes a light-diffusing surface.

5. The wing mirror of claim 1, wherein said body case includes a rear wall, at least a portion of said light emitting element being arranged in said body case so as to radiate light through said rear wall toward a rear portion of the vehicle.

6. The wing mirror of claim 1, wherein said light emitting element is adapted so as to radiate light when traffic indicator signals of the vehicle radiate light.

7. The wing mirror of claim 1, wherein said light emitting element is adapted so as to radiate light when hazard flasher signals of the vehicle radiate light.

8. A wing mirror projecting from a vehicle, said wing mirror comprising:
   a body case having an outer surface and a front wall, said outer surface of said body case having a light-transmitting coating formed thereon, said light-transmitting coating having the same color as a body of the vehicle, said front wall being formed of a light-transmitting material;
   a mirror housed in said body case;
   a light emitting element arranged in said body case so as to oppose at least said front wall such that light is radiated from said light emitting element through at least said front wall of said body case.

9. The wing mirror of claim 8, wherein said body case has an inner surface including a light-diffusing surface on at least a portion of said inner surface.

10. The wing mirror of claim 9, wherein an entirety of said inner surface includes a lightdiffusing surface.

11. The wing mirror of claim 8, wherein said body case includes a rear wall formed of a light-transmitting material, at least a portion of said light emitting element being arranged in said body case so as to radiate light through said rear wall toward a rear portion of the vehicle.

12. The wing mirror of claim 8, wherein said light emitting element is adapted so as to radiate light when traffic indicator signals of the vehicle radiate light.

13. The wing mirror of claim 8, wherein said light emitting element is adapted so as to radiate light when hazard flasher signals of the vehicle radiate light.

14. A wing mirror projecting from a vehicle, said wing mirror comprising:
   a body case having an outer surface, an inner surface, and a front wall, said outer surface of said body case having a light-transmitting coating formed on an entirety thereof, said inner surface having a non-light-transmitting coating formed on a portion thereof, said front wall being formed of a light-transmitting material;
   a mirror housed in said body case;

a light emitting element arranged in said body case so as to oppose at least said portion of said inner surface having said non-light-transmitting coating such that light is radiated from said light emitting element through at least said front wall of said body case.

15. The wing mirror of claim 14, wherein at least said outer surface of said body case has the same color as a body of the vehicle.

16. The wing mirror of claim 14, wherein said inner surface includes a light-diffusing surface on at least a portion of said inner surface.

17. The wing mirror of claim 16, wherein an entirety of said inner surface includes a light-diffusing surface.

18. The wing mirror of claim 14, wherein said body case includes a rear wall formed of a light-transmitting material, at least a portion of said light emitting element being arranged in said body case so as to radiate light through said rear wall toward a rear portion of the vehicle.

19. The wing mirror of claim 14, wherein said light emitting element is adapted so as to radiate light when traffic indicator signals of the vehicle radiate light.

20. The wing mirror of claim 14, wherein said light emitting element is adapted so as to radiate light when hazard flasher signals of the vehicle radiate light.

21. A wing mirror projecting from a vehicle, said wing mirror comprising:

a body case having an outer surface and a front wall, said outer surface of said body case having a light-transmitting coating formed thereon by metallizing, said front wall being formed of a light-transmitting material;

a mirror housed in said body case;

a light emitting element arranged in said body case so as to oppose at least said front wall such that light is radiated from said light emitting element through at least said front wall of said body case.

22. The wing mirror of claim 21, wherein at least said outer surface of said body case has the same color as a body of the vehicle.

23. The wing mirror of claim 21, wherein said body case has an inner surface including a light-diffusing surface on at least a portion of said inner surface.

24. The wing mirror of claim 23, wherein an entirety of said inner surface includes a light-diffusing surface.

25. The wing mirror of claim 21, wherein said body case includes a rear wall formed of a light-transmitting material, at least a portion of said light emitting element being arranged in said body case so as to radiate light through said rear wall toward a rear portion of the vehicle.

26. The wing mirror of claim 21, wherein said light emitting element is adapted so as to radiate light when traffic indicator signals of the vehicle radiate light.

27. The wing mirror of claim 21, wherein said light emitting element is adapted so as to radiate light when hazard flasher signals of the vehicle radiate light.

* * * * *